United States Patent Office 2,816,083
Patented Dec. 10, 1957

2,816,083

METHOD OF CONDITIONING SOILS AND CONDITIONING AGENTS THEREFOR

Newton H. Shearer, Jr., Kingsport, Tenn., assignor to Eastman Kodak Company, Rochester, N. Y., a corporation of New Jersey No Drawing. Application April 29, 1954, Serial No. 426,596

10 Claims. (Cl. 260—41)

This invention relates to new and improved soil conditioning agents particularly adapted for improving the physical structure of soils so as to increase the hydraulic stability and improve the tilth of soils normally subject to packing and erosion, whereby the crop yields are greatly enhanced.

Many of the surface soils, and particularly the clay soils are subject to soil packing and baking, whereby the yield from crops planted in such soils is greatly reduced. Furthermore, such soils do not normally form suitable crumb aggregates and hence are subject to erosion due to the fact that the soil resists the penetration of rainfall and readily breaks down at the surface into fine silt which is readily washed away by the excessive run-off of water due to the dense packing of the soil. Such soils also tend to form a surface crust which cracks badly and allows the escape of the soil moisture into the atmosphere. Intensive cultivation helps to retain the soil moisture by preventing the formation of a crust which can crack, but such intensive cultivation is both uneconomical and impractical in many cases due to the tendency of the soil to pack down following such cultivation.

The tilth of such clay soils can be improved by the incorporation of fertilizers or humus materials over a period of years, but such soil conditioning methods are both slow and costly. It is therefore desirable to have a means for rapidly increasing the tilth of soils by improving the physical structure so that the soils form stable aggregates which do not readily break down under ordinary wet conditions, and which improve the ability of the soil to retain soil moisture. Furthermore, soils comprising a substantial amount of stable aggregates allow the penetration of rainfall whereby the soil retains a larger proportion of the moisture than soils which pack readily and cause excessive runoff. This also serves to greatly minimize the erosion of the soils and hence prevents the loss of valuable surface soils from crop-producing fields. In the case of soils which pack readily, such as clay soils, the germination percentage of many seeds is much lower than is desired. Furthermore, in such heavy soils, many of the young plants die shortly after germination due to the packing of the soils around the root system of the plants. This, of course, greatly reduces the yield of crops from such soils and poses a serious problem in crop production. By the use of suitable soil conditioning agents, the physical structure of the soil can be modified so that the germination percentage is increased, and the survival chances of freshly germinated seeds is greatly enhanced.

It is therefore an object of this invention to provide new and improved soil conditioning agents which are capable of rapidly improving the physical structure of soils with a subsequent improvement in the tilth and hydraulic stability of such soils.

Another object of the invention is to provide a method for improving the tilth and hydraulic stability of soils normally subject to objectionable erosion and slaking by means of improved soil additives having greatly increased effectiveness over the synthetic additives now commercially available.

Another object of the invention is to provide a more highly effective means of increasing the crop yield from soils such as clay soils which normally produce relatively poor yields due to the packing characteristics of the soil.

Another object of the invention is to provide new synthetic soil conditioning agents which are capable of modifying the physical structure of soils so as to give stable agglomerates of the soil particles which remain in the improved physical condition for prolonged periods of time, thus reducing the necessity for intensive cultivation.

Other objects will be apparent from the description and claims which follow.

These and other objects of the invention are attained by incorporating into a soil from 0.001% to 2% by weight based on the weight of the soil being treated, of an alkaline salt of a copolymer of 70–95% by weight of N-isopropyacrylamide and 30–5% by weight of a copolymerizable acid, which can be either acrylic acid or maleic acid. The copolymer salts of this invention have been found to be more than four times as effective as the known synthetic conditioning agents commercially available in increasing the tilth and hydraulic stability of surface soils and particularly soils containing substantial amounts of clay. The improved soil conditioning characteristics of the compositions embodying this invention appear to depend upon the particular monomer combinations employed in preparing the copolymer and also upon the relative proportions of such monomer. The conditioning agents can contain as much as 95% by weight of combined N-isopropylacrylamide in the polymer molecule, but desirably contain from 70 to 90% by weight of combined N-isopropylacrylamide for optimum utility. The copolymers containing as much as 95% by weight of combined N-isopropylacrylamide are effective soil conditioning agents as compared to those containing agents employed heretofore but are less desirable than those containing 70 to 90% by weight of combined N-isopropylacrylamide.

In practicing the invention, either maleic acid or acrylic acid can be copolymerized with the N-isopropylacrylamide in amounts of from 5 to 30% by weight of such acid based on the combined weight of the monomers. For optimum results, acrylic acid copolymers are preferred to the maleic acid copolymers since improved tilth and hydraulic stability result from the use of the acrylic acid copolymers. At concentrations above 30% by weight of the acid component, the soil conditioning effectiveness of the copolymer drops off rapidly and hence such copolymers containing more than about 30% by weight of combined acrylic acid or maleic acid are not included within the scope of this invention. Optimum effectiveness appears to be obtained with a copolymer containing about 90% by weight of combined N-isopropylacrylamide, although the other copolymers within the ranges herein defined give excellent results and are included within the scope of the invention. The compounds of this invention have good flocculating action on suspended clay soils and hence impart superior hydraulic stability to clay soils when applied in amounts of from 0.001 to 2% by weight based on the total weight of the soil being treated.

The copolymer conditioning agents of this invention are employed in the form of alkaline salts which can be formed prior to the addition to the soil, or which can be formed in situ. Thus, for example, it is within the scope of this invention to add a mixture of the copolymer and an alkaline salt forming each in the dry form to the soils, whereby the salt of the copolymer is formed in the soil under the influence of the soil moisture. In either case it is considered that the copolymer salt is incorporated into the soil regardless of whether it is preformed or formed during the incorporation. Any of the alkaline salts of the copolymer can be employed, including both the alkali metal salts and the alkaline earth salts of such copolymers. For convenience, the salt is desirably either a calcium or a sodium salt of the copolymer, although any of the other well known alkaline salts can be readily formed and are included within the scope of this invention. Thus, for example, the potassium and ammonium salts are entirely suitable for use in practicing the invention, and in some cases may be preferred, particularly where it is desired to incorporate either potassium or ammonium, or some other alkaline salt-forming material, into the soil by means of the soil conditioner.

The soil conditioners can be added to the soils in solution form, or they can be added in dry form either as the pulverized copolymer salt, or as a mixture of the dry powdered copolymer and the salt-forming material, or as a mixture of either of these latter two with other materials such as inert fillers, plant nutrients, or similar materials. Thus for some purposes it may be desirable to incorporate the soil conditioning agent into a natural or synthetic fertilizer which can be added to the soil in a single application. When the soil conditioning agent is to be added alone and in the dry form, it is often desirable to include the soil conditioning agent in an inert filler in order to facilitate the incorporation of small amounts of the soil conditioner. Any suitable filler may be used such as cement dust, calcium carbonate, sodium carbonate, and similar materials. In many cases, the filler can also be the source of the salt-forming material.

The following examples illustrate the preparation of typical soil conditioning agents embodying the invention. It will be understood, however, that these examples are included merely for purposes of illustration and are not intended to limit the scope of the invention as described herein, unless otherwise specifically indicated.

EXAMPLE 1

A mixture of 9 g. of N-isopropylacrylamide, 1 g. of acrylic acid, 0.025 g. of potassium persulfate, and 0.025 g. of potassium bisulfite in 90 g. of water was allowed to polymerize at room temperature for 24 hours. A sample of the resulting copolymer was isolated by evaporation of the aqueous solution. The inherent viscosity of this copolymer as determined in dimethylformamide solution was 2.85. Various salts of this polymer were prepared by adding a quantity of an alkaline metal to the aqueous solution sufficient to neutralize the acrylic acid present. In this manner, the calcium, sodium, potassium and ammonium salts were readily prepared in aqueous solution. The aqueous solutions were diluted to 1% concentration for use in soil conditioning evaluation. Solid forms of these various agents were prepared by evaporation of the various salt solutions in a circulating air oven at 50° C. The resulting solids were ground to a size below 200 mesh by means of a ball mill. These powdered polymers were then mixed in equal amounts with diluents such as cement dust, calcium carbonate, sodium carbonate, or the like. Both the aqueous solutions and the solid formulations were used in soil conditioning evaluations.

EXAMPLE 2

In a similar manner to that of the preceding example, both solid and aqueous forms of the various salts of an 80:20 N-isopropylacrylamide-acrylic acid copolymer were prepared. The polymerization to form the copolymer was effected using a solution of 8 parts by weight of N-isopropylacrylamide, 2 parts of acrylic acid, 0.03 part of potassium persulfate, and 0.03 part of potassium bisulfite in 90 parts of water. The effectiveness of various of these soil conditioners is described hereinafter in connection with the evaluation data.

EXAMPLE 3

Alkaline salts of a 95:5 N-isopropylacrylamide-acrylic acid copolymer were prepared as in Example 1 from the copolymer obtained from 9.5 parts by weight of N-isopropylacrylamide, 0.5 part of acrylic acid, 0.01 part of potassium persulfate, and 0.01 part of potassium bisulfite in 90 parts of water.

EXAMPLE 4

The 70:30 N-isopropylacrylamide-acrylic acid copolymer was prepared in similar fashion using 7.0 parts of N-isopropylacrylamide, 3.0 parts of acrylic acid, 0.05 part of potassium persulfate, 0.05 part of potassium bisulfite, and 90 parts of water.

EXAMPLE 5

The N-isopropylacrylamide-maleic acid copolymers are prepared in a similar manner. The copolymer is desirably prepared using maleic anhydride instead of free maleic acid in accordance with the well known practice in the polymerization art. As an example, a 90:10 N-isopropylacrylamide-maleic acid copolymer was prepared as in Example 1 using 9.0 parts by weight of N-isopropylacrylamide, 1.0 part of maleic anhydride, 0.01 part of potassium persulfate, 0.01 part of potassium bisulfite, and 90 parts of water. This and similar N-isopropylacrylamide-maleic acid copolymers readily form alkaline salts in the same way as do the acrylic acid copolymers.

The preparation of the copolymers of this invention proceeds readily in accordance with well known polymerization practices and hence such polymerization techniques need not be set out in detail here, since they form no part of the invention. Thus the polymerization can be effected at room temperature or at elevated temperatures using any of the dispersion polymerization processes including both solution and emulsion polymerization techniques. Similarly, any of the well known polymerization catalysts can be employed for facilitating the course of the polymerization, including any of the well known per-catalysts such as the peroxides, persulfates, perborates, and the like, either alone or in redox catalyst systems as described in the detailed examples.

The highly effective action of the soil conditioning agents of this invention in improving the hydraulic stability of soils is shown in Table I. The hydraulic stability was evaluated using the wet-sieving technique described by Yoder in J. Am. Soc. Agron 28, 337 (1936) whereby the aggregate stability of dry crumbs obtained by treating Holston sandy clay with various conditioning agents was determined. In these evaluations, the Holston sandy clay was pulverized to pass a 60 mesh screen. Thereafter, an aqueous solution of the conditioning agent was applied to the soil with the amount of water being regulated so as to give a moist soil sample containing 40% by weight of water. The moist soil was allowed to air dry and was then broken into particles of 10–18 mesh size and subjected to the wet sieving for a total of 15 minutes. When the solid forms of soil conditioning agent were used instead of the solution, these solid agents were intimately mixed with the dry 60 mesh soil, and then 40 parts of water per 100 parts of soil was applied, and the test carried out as described. The hydraulic stability was determined by the percent of stable aggregates larger than 0.25 mm. after the wet sieving at various concentrations of the conditioning agent based on the soil weight.

In column 1 of Table I the designation I represents N-isopropylacrylamide, A represents acrylic acid, and M represents maleic acid. Thus, for example 90I–10A designates a copolymer of 90% by weight of N-isopropylacrylamide and 10% by weight of acrylic acid. The last two items in the table represent commercially available soil conditioners for comparison. The percentage concentrations represent the concentration of the soil conditioning agent based on the weight of dry soil.

Table I
HYDRAULIC STABILITIES

| Polymeric Agent | Form of Salt | Physical Form | Percent Stable Aggregates Above 0.25 mm. | | |
|---|---|---|---|---|---|
| | | | 0.025% Conc. | 0.05% Conc. | 0.10% Conc. |
| 90I–10A | Calcium | Solution | 69 | 78 | 82 |
| 90I–10A | Sodium | do | 54 | | |
| 80I–20A | Calcium | do | 55 | | |
| 80I–20A | do | Solid | 57 | | |
| 80I–20A | Sodium | Solution | 62 | | |
| 70I–30A | Calcium | do | 40 | 59 | 64 |
| 70I–30A | Half Calcium | do | 52 | 55 | 68 |
| 90I–10M | Sodium | do | 50 | | 78 |
| 70I–30M | do | do | 51 | | 65 |
| Vinyl Acetate-Maleic Acid Copolymer | | Solid | 18 | 38 | 54 |
| Sodium Polyacrylate | | do | 3 | 30 | 44 |

It is apparent from this data that the copolymer salts of this invention are in general about four times as effective as commercial vinyl acetate-maleic acid copolymer salts used as coil conditioners, and more than four times as effective as sodium polyacrylate. This can be seen when it is considered that a 0.025% concentration of the conditioning agents of this invention is at least as effective as a 0.1% concentration of such other soil conditioning agents. Consequently, only a quarter as much of the conditioning agents of this invention need be used as must be used of other soil conditioning agents. Conversely, when equal amounts are used, the conditioning agents of this invention give greatly improved results. This is especially apparent when the germination data set out hereinafter is considered.

The action of the soil conditioning agents of this invention as well as other polyelectrolyte conditioners depends upon the presence of some moisture in the soil. Ordinarily, there is sufficient soil moisture present to develop the utility of these conditioning agents. In the case of very dry soils, however, it may be desirable to add moisture to the soil either before, during or after the application of the soil conditioning agents in order that the soil can form stable aggregates at that time.

The effectiveness of the conditioners of this invention is demonstrated by germination and growth tests which were carried out with various embodiments of the invention in comparison with other soil conditioners. Thus, replicated plots of one square foot area were treated with various conditioning agents at concentrations ranging from 0.2% to 0.02%. The rates of germination and rates of growth using the various agents were compared using tobacco seeds, tomato seeds, and bluegrass seeds, since these plants are particularly sensitive to differences in soil structure. Plant growth tests were also carried out on potted plants such as begonias, lantanas, and gloxinias. Root crops such as turnips and beets were also used. In all cases, the N-isopropylacrylamide copolymer with either acrylic acid or maleic acid gave better rates of germination and better plant growth than did the same concentration of vinyl acetate-maleic acid copolymer salt or sodium polyacrylate. In general, the 0.02% concentration of the conditioning agents embodying this invention was nearly equivalent to the 0.1% concentration of such other conditioning agents.

In Table II, typical germination results are set out using tobacco seeds in one square foot plots of Holston fine sandy clay containing 0.1% of each agent.

Table II
GERMINATION OF TOBACCO SEEDS AT 0.1% CONCENTRATION

| Polymeric Agent | Germination Per Square Foot |
|---|---|
| 90I–10A Sodium Salt | 142 plants. |
| Commercial Conditioner (Vinyl Acetate-Maleic Acid) | 115 plants. |
| Sodium Polyacrylate | 85 plants. |
| Control | 57 plants. |

The greatly increased effectiveness of the conditioners of this invention is clearly demonstrated by the results set out in Table II. Thus, by the use of these new and improved conditioners, the crop yield of clay soils can be greatly improved since the germination percentage is enhanced to a very marked degree.

Similar results were obtained with other materials embodying this invention. Thus in Tyler red clay plots containing 0.2% of the conditioner, the rate of germination was much faster in those plots treated with the sodium salt of a 90:10 N-isopropylacrylamide-maleic acid copolymer than in similar plots treated with sodium polyacrylate. The plants in the plots treated in accordance with this invention had reached a height of about one inch by the time the plants in the other plots had just broken through the soil. Furthermore, faster rates of plant growth and healthier plants were obtained in the plots treated in accordance with this invention than in those treated with sodium polyacrylate. In the control plots, a few seeds germinated successfully, but all plants died shortly after germination due to the tight packing of the clay soil around the root systems.

Thus by means of this invention employing copolymers prepared from particular monomer compositions in a particular composition range, greatly improved soil conditioning results are obtained. The agents embodying this invention are readily adapted for large scale agricultural use since they utilize low cost raw materials and also provide agents which are about four times as effective as the soil conditioning agents used heretofore.

Although the invention has been described in considerable detail with particular reference to certain preferred embodiments thereof, variations and modifications can be effected within the spirit and scope of the invention as described hereinabove and as defined in the appended claims.

I claim:

1. The method of improving the tilth and hydraulic stability of coil which comprises incorporating into a soil from 0.001% to 2% by weight based on the soil of an alkaline salt of a copolymer of about 90% by weight of N-isopropylacrylamide and about 10% by weight of a copolymerizable acid selected from the group consisting of acrylic acid and maleic acid.

2. The method of improving the tilth and hydraulic stability of a clay soil which comprises forming an intimate mixture in the presence of moisture of a clay soil and from 0.001% to 2% by weight based on the soil weight of a calcium salt of a copolymer of about 90% by weight of N-isopropylacrylamide and about 10% by weight of acrylic acid.

3. The method of improving the tilth and hydraulic stability of a clay soil which comprises forming an intimate mixture in the presence of moisture of a clay soil and from 0.001% to 2% by weight based on the soil weight of a sodium salt of a copolymer of about 90% by weight of N-isopropylacrylamide and about 10% by weight of acrylic acid.

4. The method of improving the tilth and hydraulic stability of a clay soil which comprises forming an intimate mixture, in the presence of moisture, of a clay soil and from 0.001% to 2% by weight based on the soil weight of a calcium salt of a copolymer of about 90% by weight of N-isopropylacrylamide and about 10% by weight of maleic acid.

5. The method of improving the tilth and hydraulic stability of a clay soil which comprises forming an intimate mixture, in the presence of moisture, of a clay soil and from 0.001% to 2% by weight based on the soil weight of a sodium salt of a copolymer of about 90% by weight of N-isopropylacrylamide and about 10% by weight of maleic acid.

6. An improved soil conditioner especially effective for improving the tilth and hydraulic stability of clay soils which comprises an alkaline salt of a copolymer of about 90% by weight of N-isopropyl-acrylamide and about 10% by weight of a copolymerizable acid selected from the group consisting of acrylic acid and maleic acid.

7. As an improved soil conditioner, a sodium salt of a copolymer of about 90% by weight of N-isopropyl-acrylamide and about 10% by weight of acrylic acid.

8. As an improved soil conditioner a calcium salt of a copolymer of about 90% by weight of N-isopropyl-acrylamide and about 10% by weight of acrylic acid.

9. As an improved soil conditioner, a sodium salt of a copolymer of about 90% by weight of N-isopropyl-acrylamide and about 10% by weight of maleic acid.

10. As an improved soil conditioner, a calcium salt of a copolymer of about 90% by weight of N-isopropyl-acrylamide and about 10% by weight of maleic acid.

References Cited in the file of this patent
UNITED STATES PATENTS 2,625,529   Hedrick et al. _____ Jan. 13, 1953